United States Patent [19]

Rybicki

[11] 4,175,913
[45] Nov. 27, 1979

[54] HELICOPTER ROTOR HEAD MOUNTING ASSEMBLY

[75] Inventor: Robert C. Rybicki, Trumbull, Conn.

[73] Assignee: The United States of America as represented by the Secretary of the Army, Washington, D.C.

[21] Appl. No.: 869,185

[22] Filed: Jan. 13, 1978

[51] Int. Cl.² .......................................... B64C 11/02
[52] U.S. Cl. ................................. 416/244 R; 403/170
[58] Field of Search ............ 416/244 A, 244 R, 244 B; 403/369, 370, 371, 374

[56] References Cited

U.S. PATENT DOCUMENTS

| | | | |
|---|---|---|---|
| 2,547,789 | 4/1951 | Skeel | 403/370 |
| 2,899,222 | 8/1959 | Ross | 416/244 |
| 3,023,035 | 2/1962 | Kelley | 416/244 |
| 3,063,743 | 11/1962 | Kylen | 416/244 B |
| 3,229,028 | 1/1966 | Rapuzzi et al. | 403/369 |
| 3,625,631 | 12/1971 | Covington et al. | 416/244 |
| 3,957,381 | 5/1976 | Schafer | 416/244 |
| 3,972,491 | 8/1976 | Ferris et al. | 416/150 |
| 4,012,154 | 3/1977 | Durwin | 403/370 |

FOREIGN PATENT DOCUMENTS 805677  7/1949  Fed. Rep. of Germany ........... 416/244

Primary Examiner—Everette A. Powell, Jr.
Assistant Examiner—A. N. Trausch, III
Attorney, Agent, or Firm—Nathan Edelberg; Norman L. Wilson, Jr.; Robert P. Gibson

[57] ABSTRACT

A helicopter rotor head mounting assembly includes a rotor drive shaft and a rotor hub splined to the shaft for rotation therewith. The rotor hub includes a central bore having an internal tapered portion which is forced downwardly upon a mating tapered portion of the rotor drive shaft. An annular split cone is mounted between the rotor shaft and the hub at a bottom portion of the hub bore and the split cone is forced upwardly into firm engagement with the hub and drive shaft by means of a plurality of individual loading means which are carried by an annular plate affixed to the bottom of the hub. The loading means are individually adjustable and apply loading force directly onto the split cone to thereby assure a secure, non-vibrational rotation of the hub with the rotor shaft.

3 Claims, 5 Drawing Figures

HELICOPTER ROTOR HEAD MOUNTING ASSEMBLY

BACKGROUND AND SUMMARY OF THE INVENTION

The present invention relates to helicopter construction and more particularly to the rotor head mounting assembly thereof. A vertical drive shaft extends upwardly from a helicopter and a rotor hub is affixed to the drive shaft and carries the rotor blades for rotation with the drive shaft. It can easily be appreciated that the connection of the rotor hub to the drive shaft must be such that the hub and the drive shaft move as one and no movement is allowed therebetween to permit vibrations which would lead to ultimate failure of the assembly.

The invention is an improvement on a helicopter rotor head assembly disclosed in U.S. Pat. No. 3,112,941 to Dutton which issued Dec. 3, 1963. The disclosure of the Dutton patent is incorporated herein by reference thereto. The Dutton patent discloses a rotor head assembly, including an elongated, substantially cylindrical rotor drive shaft having an inward taper near the upper end thereof, and having a threaded portion beginning proximate the smallest diameter portion of the taper and extending upwardly the remaining length of the drive shaft. The rotor shaft has a vertically splined portion about the outer surface thereof below the taper and a rotor hub adapted to carry a plurality of helicopter rotor blades is received by the rotor shaft. The rotor hub has a longitudinal bore therethrough with a first tapered portion at the upper end thereof conforming to the taper on the rotor shaft. The bore is internally splined below the first tapered portion to conform to and mate with the splined portion of the rotor shaft for secure rotation therewith. The bore expands radially, outwardly, and downwardly at a location below the internal splines to produce a second tapered portion therewithin, and a mounting nut is screwed downwardly upon the drive shaft threaded portion to apply a force downwardly upon the hub to firmly engage the taper of the rotor shaft with the first tapered portion of the hub. Additionally, a plurality of circumferentially spaced compression bolts mounted on the rotor mounting nut act to further insure firm engagement between the hub and drive shaft.

According to the Dutton patent, a lower annular cone member is bolted to the bottom surface of the hub and is forced upwardly against an annular flange on the rotor drive shaft in order to secure the drive shaft to the rotor hub at the lower end thereof.

The purpose of the somewhat elaborate assembly disclosed by Dutton is to insure a secure, firm engagement between the rotor hub and the rotor drive shaft utilizing a construction which may be assembled and disassembled with the necessity of large hydraulically operated tools. In addition to permitting the use of smaller hand tools, the Dutton assembly provides a more uniform and accurate loading in placing the rotor hub on the rotor shaft than was theretofore known. However, the use of a full circular ring member having an integral lower cone thereon which is adapted to simultaneously contact three different surfaces on the drive shaft and hub presents serious dimensional tolerance problems which in practice would most likely prevent proper loading of the lower cone member on the drive shaft flange, the vertical drive shaft surface and the lower tapered hub surface. If, for example, contact is made between the drive shaft flange and the cone, no pressure can be exerted between the lower tapered hub surface and the cone.

In order to alleviate the problems associated with the Dutton assembly, a bottom circular pressure plate was developed with a separate diametrically split cone. The bottom pressure plate included radial slots which permitted the inner annular edge of the ring to bend upwardly against the cone to load the cone as the plate was bolted to the bottom surface of the hub. This assembly has proven to be not entirely satisfactory since excessive bolt torquing is required to effect bending of the metal circular ring, and proper loading of the split cone is difficult to achieve since the loading forces on the cone are dependent on the toroidal flexibility of the plate and installation tolerances, and elastic deflections of the mechanical parts inhibit perfect allignment of the hub with the split cone.

The present invention provides a helicopter rotor head assembly similar to that disclosed by Dutton in the above-mentioned patent; however, the deficiencies referred to above with respect to the lower cone assembly of Dutton and the slotted pressure plate are eliminated by the use of a lower split cone assembly having an annular plate secured to the bottom of the hub around the rotor shaft and a plurality of loading bolts angularly carried around the plate which are individually torqued to apply upwardly directed forces on the split cone to thereby provide for a balanced loading of the split cone with a minimum of bolt torquing. Sincethe split cone is fabricated separately from the annular plate, machine tolerances required for the instant invention are much lss than that required for the assembly disclosed in the Dutton patent. Also, since the loading forces are directly applied upon the split cone, there is no possibility that a portion of the load forces will be utilized to produce a bending moment in a rigid metal plate such as was the case in the prior art, and the degree of loading can be better controlled. The angular positioning of the bolts serves to reduce friction along the tapered contact surfaces and provides a radial force component to the cone to increase joint efficiency.

It is therefore the main object of the invention to provide an improved helicopter rotor head assembly wherein the rotor hub is secured to the helicopter drive shaft in a simple and economical manner while producing a non-vibrational rotation of the hub on the drive shaft.

It is another main object of the invention to provide an assembly of the character set forth above, wherein a lower split cone is loaded between a drive shaft and a hub by means of individual loading bolts mounted on a separate annular plate affixed to the bottom of the rotor hub.

BRIEF DESCRIPTION OF THE DRAWINGS

These as well as other objects and advantages of the present invention will become more apparent upon a reading of the detailed description of the preferred embodiment presented hereinbelow, in conjunction with the drawings wherein.

DETAILED DESCRIPTION OF THE PREFERRED EMBODIMENTS

Figure 1:
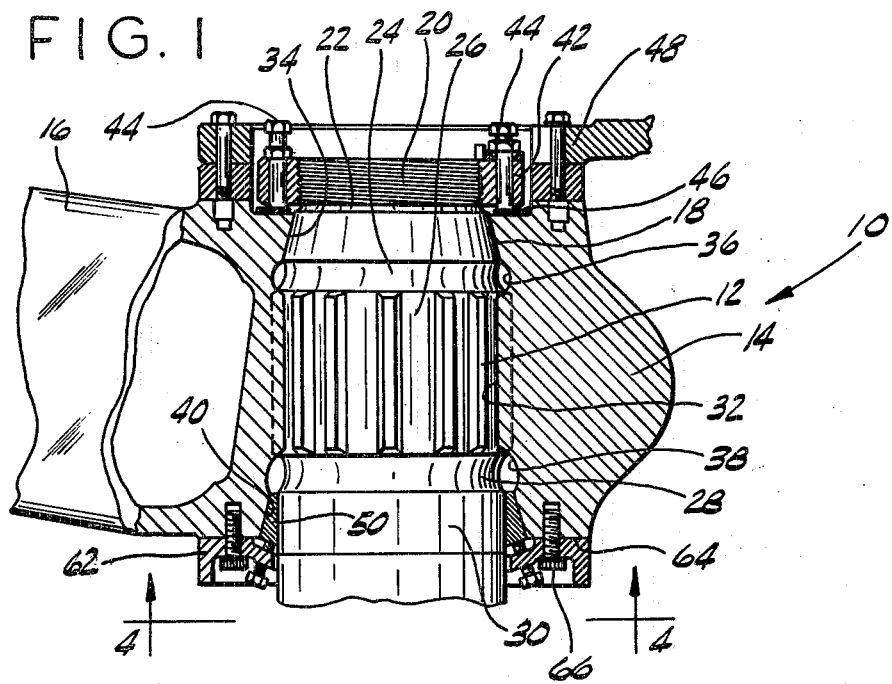
FIG. 1 is a vertical cross-section of a rotor of a helicopter rotor head assembly constructed in accordance with the principles of the present invention.

Referring now to the drawings wherein like reference characters designate like or corresponding parts throughout the several views, there is shown in FIG. 1 a helicopter rotor head assembly 10 including a rotor drive shaft 12 and a rotor hub 14. Drive shaft 12 is adapted to be rotated about the vertical axis thereof by helicopter engine means (not shown) located therebelow. Rotor hub 14 is adapted to carry a plurality of rotor blades (not shown) by means of a plurality of circumferentially spaced rotor blade hub arms 16. Rotor drive shaft 12 is substantially cylindrical and includes an inward taper 18 near the upper end thereof. Shaft 12 also includes a threaded portion 20 beginning proximate the smallest diameter portion of taper 18 and extending upwardly the remaining length of drive shaft 12. As shown, an annular groove 22 is provided between taper 18 and threaded portion 20 of shaft 12. Just below taper 18 there is provided in shaft 12 an annular groove 24 and therebelow shaft 12 includes vertically splined portion 26 about the outer surface thereof. Just below splined portion 26 there is cut another annular groove 28 in shaft 12 and therebelow shaft 12 is machined vertically cylindrical as indicated at 30.

Rotor hub 14 is received by shaft 12 and includes a longitudinal bore 32 therethrough. Bore 32 is provided with a first tapered portion 34 at the upper end thereof which conforms to taper 18 on shaft 12. Bore 32 includes annular grooves 36 and 38 at locations corresponding to the vertical positions of annular grooves 24 and 28 respectively of shaft 12. Between annular grooves 36 and 38 hub 14 is internally splined to conform to and mate with splined portion 26 of shaft 12 for secure rotation therewith. Below groove 38, bore 32 of hub 14 expands outwardly and downwardly to produce a second tapered portion 40.

Secured to shaft 12 by means of upper threaded portion 20 is a rotor mounting nut 42 which carries a plurality of circumferentially spaced compression bolts 44. After hub 14 is placed over shaft 12 mounting nut 42 is utilized to prevent hub 14 from disengaging from shaft 12. Compression bolts 44 are torqued to produced a downward force on annular dogplate 46 and hub 14 so that tapered portion 34 of hub bore 32 is forced into firm engagement with tapered portion 18 of shaft 12. Additional means not pertinent to the disclosure of the present invention may be connected to hub 14 by means of mounting assembly 48.

Figure 2:
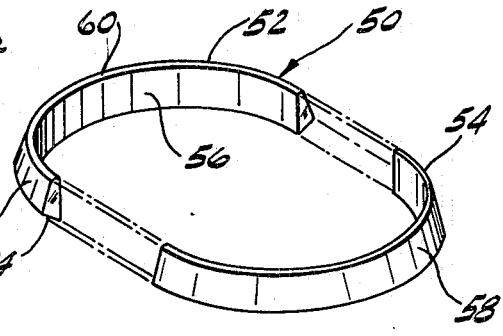
FIG. 2 is a perspective view of a split cone.

According to the principles of the present invention, an annular split cone 50 fabricated of two semi-circular halves 52 and 54 (FIG. 2) is wedged upwardly into engagement with shaft 12 and hub 14. As clearly shown in FIG. 3, split cone 50 has a cylindrical inner surface 56 conforming to cylindrical surface 30 of shaft 12 and a tapered outer surface 58 conforming to and mating with tapered portion 40 of hub bore 32. Split cone 50 also includes an upper edge 60 which is free from engagement with both shaft 12 and hub 14 due to the juxtaposition thereof with shaft groove 28 and hub groove 38.

Figure 3:
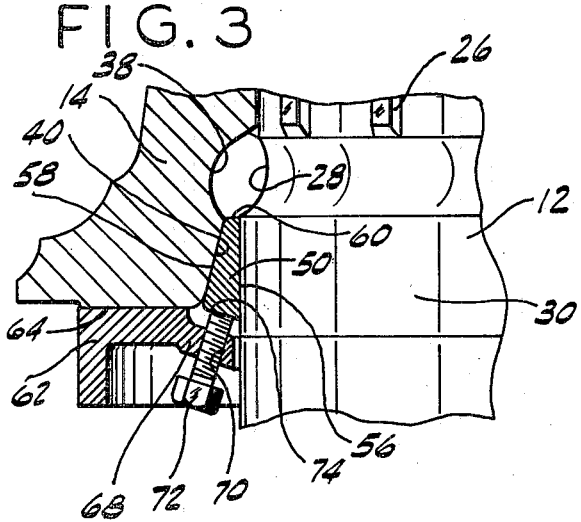
FIG. 3 is an enlarged view of one side of the lower split cone assembly.
Figure 4:
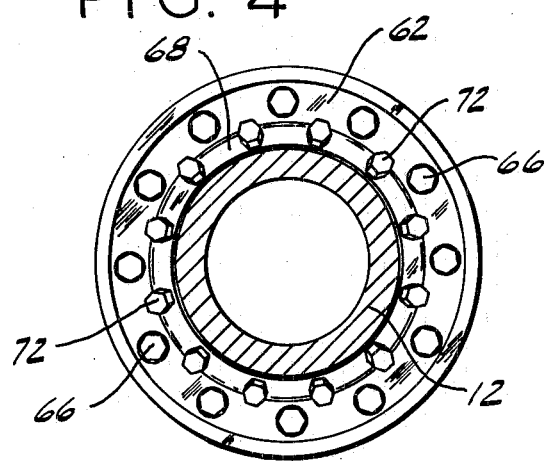
FIG. 4 is a bottom view of the assembly of FIG. 1 taken along line 4—4 of FIG. 1.

An annular plate 62 is secured to the bottom surface 64 of hub 14 by means of 12 circumferentially spaced attaching bolts 66, best shown in FIGS. 1 and 4. Plate 62 includes a unitary, radially-inwardly and downwardly directed annular flange 68 in which are provided 12 circumferentially spaced threaded bores 70 (FIG. 3). A loading bolt 72 is threadingly secured within each bore 70 and each bolt 72 is positioned with respect to split cone 50 so that the axis of each bolt 72 is perpendicular to the lower surface 74 of split cone 50, and the axis of each bolt 72 is parallel to tapered surfaces 40 and 58. It is evident that each of the loading bolts 72 is independently moveable with respect to plate 62 and can apply an individual upwardly directed force onto split cone 50. Upon applying the proper torque to each of loading bolts 72, split cone 50 exerts a predetermined force upon both the tapered surface 40 of hub 14 and the cylindrical surface 30 of shaft 12 to thereby insure a forced engagement between rotor shaft 12 and inner surface 56 of split cone 50 and between hub 14 and outer surface 58 of split cone 50. Since upper surface 60 of split cone 50 is free from engagement from both rotor shaft 12 and rotor hub 14, the proper loading forces on hub 14 and shaft 12 can be provided without the necessity of extreme machine tollerances. Further, since split cone 50 is completely separate from plate 62, there is no need for producing bending moments in plate 62 as was the case in prior art assemblies. The direction of the axis of each of bolts 72 is an important teaching of this invention for several reasons. First, the orientation of the bolt axis parallel to that of the hub tapered surface 40 decreases to a minimum the friction forces tending to oppose sliding between the cone 50 and hub 14. At the same time, the angularity of bolts 72 results in a component of force directed radially inward, tending to drive the cone 50 tighter against the shaft 12 to achieve a tight and efficient joint. A further function of the angularity is the increased accessability of the bolt heads to torque wrenches required to clear shaft 12.

It can therefore be seen that the novel helicopter rotor head assembly described hereinabove provides a firm, secure, non-vibrational connection between shaft 12 and hub 14 without the necessity of expensively machines parts or heavy hydraulic tools.

Figure 5:
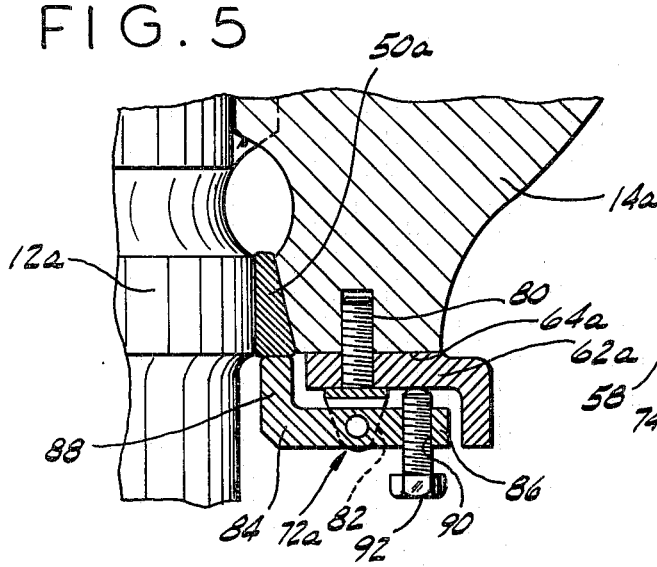
FIG. 5 is a vertical cross-section of an alternative split cone loading means.

FIG. 5 shows an alternate embodiment of the invention wherein plate 62a secured to the bottom surface 64a of hub 14a includes a plurality of pivoted dogs 72a which are circumferentially spaced around plate 62a similar to the loading bolts 72 of the embodiment shown in FIGS. 1–4. Each of pivoted dogs 72a includes a main bolt 80 secured through plate 62a and into hub 14a and having a bifurcated pivot lug 82 at the head end thereof. A pivot lever 84 includes a body portion 86 pivoted to lug 82 and a loading portion 88 positioned to contact split cone 50a. A threaded bore 90 through body portion 86 is located on the opposite side of pivot lug 82 from loading arm 88. A loading bolt 92 is threadingly engaged in bore 90 and upon the torquing of bolt 92 pivot arm 84 will pivot about lug 82 to force loading arm 88 into engagement with split cone 50a and thereafter provide the necessary pressure on shaft 12a and hub 14a as described hereinabove. An advantage of the embodiment of FIG. 5 is that the loading bolts 92 are positioned farther radially outward than are loading bolts 72 of the embodiment of FIGS. 1-4, and therefore the circumference upon which bolts 92 are placed is larger, enabling the use of a greater number of loading bolts 92 than is permitted in the formerly described embodiment. A further advantage is the option to lengthen the arm of portion 86 to introduce a higher mechanical advantage to the pivot and allow less pivots for the same loading force.

Inasmuch as numerous modifications may be made to the invention without departing from the spirit and scope thereof, it is requested that the scope of the invention be determined solely by the following claims.

I claim:

1. In a helicopter rotor head mounting assembly having an elogated rotor drive shaft, said rotor shaft being substantially cylindrical with an inward taper near the upper end thereof, and having a threaded portion beginning proximate the smallest diameter portion of said taper and extending upwardly the remaining length of said drive shaft, said rotor shaft having a vertically splined portion about the outer surface thereof below said taper, a rotor hub adapted to carry a plurality of helicopter rotor blades received by said rotor shaft, said hub having a longitudinal bore therethrough with a first tapered portion at the upper end thereof conforming to said taper on said rotor shaft, said bore being internally splined below said first tapered portion to conform to and mate with said splined portion of said rotor shaft for secure rotation therewith, said bore expanding radially outwardly and downwardly at a location below the internal splines thereof to produce a second tapered portion therewithin, means associated with said threaded portion for applying a force downwardly on said hub to firmly engage said taper of said rotor shaft with said first tapered portion of said hub; the improvement comprising: an annular split cone mounted between said rotor shaft and said hub at the location of said second tapered portion, said split cone having a cylindrical inner surface conforming to said rotor shaft and a tapered outer surface conforming to and mating with said second tapered portion of said hub bore, said split cone having an upper edge free from engagement with both said rotor shaft and said hub, an annular plate, means securing said plate to the bottom of said hub around said rotor shaft, a plurality of circumferentially spaced loading means carried by said plate, each of said loading means being adapted to apply a radially directed force to said split cone independently, thereby distributing the radially directed force to effect a uniform forced engagement between said rotor shaft and said inner surface of said split cone.

2. The helicopter rotor head mounting assembly as specified in claim 1 and further characterized by :
said plate having a radially-inwardly and downwardly directed annular flange portion through which each of said bolts is carried; and each of said bolts being positioned so that the longitudinal axis thereof is parallel to said second tapered portion.

3. The helicopter rotor head mounting assembly as specified in claim 1 and further characterized by:
each of said loading means comprising a pivoted dog including a main bolt secured to said plate; a pivot lever pivotally mounted on said main bolt and having a loading portion located for engagement with and the loading of said split cone; a loading bolt threadingly mounted through said pivot lever on the opposite side of said main bolt from said loading portion; whereby torquing of said loading bolt pivots said pivot lever to load said split cone.

* * * * *